(12) United States Patent
Nishikawa

(10) Patent No.: US 11,308,966 B2
(45) Date of Patent: Apr. 19, 2022

(54) SPEECH INPUT DEVICE, SPEECH INPUT METHOD, AND RECORDING MEDIUM

(71) Applicant: Panasonic Intellectual Property Corporation of America, Torrance, CA (US)

(72) Inventor: Tsuyoki Nishikawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 46 days.

(21) Appl. No.: 16/828,018

(22) Filed: Mar. 24, 2020

(65) Prior Publication Data
US 2020/0312333 A1 Oct. 1, 2020

Related U.S. Application Data

(60) Provisional application No. 62/824,619, filed on Mar. 27, 2019.

(30) Foreign Application Priority Data

Oct. 30, 2019 (JP) .............................. JP2019-197231

(51) Int. Cl.
*G10L 17/00* (2013.01)
*G10L 17/04* (2013.01)

(52) U.S. Cl.
CPC .............. *G10L 17/00* (2013.01); *G10L 17/04* (2013.01)

(58) Field of Classification Search
CPC .......... G06F 3/167; G06F 3/162; G06F 3/165; G10L 17/00; G10L 17/04
See application file for complete search history.

(56) References Cited

U.S. PATENT DOCUMENTS

| | | | |
|---|---|---|---|
| 8,588,849 B2 * | 11/2013 | Patterson | H04W 4/20 455/557 |
| 10,079,024 B1 * | 9/2018 | Bhimanaik | G10L 17/06 |
| 10,388,120 B2 * | 8/2019 | Muhsin | G06F 3/167 |
| 10,796,687 B2 * | 10/2020 | Leblang | G10L 15/065 |

(Continued)

FOREIGN PATENT DOCUMENTS

JP  2006-313261  11/2006

OTHER PUBLICATIONS

Extended European Search Report dated Aug. 5, 2020 in corresponding European Patent Application No. 20166229.3.

*Primary Examiner* — Jakieda R Jackson
(74) *Attorney, Agent, or Firm* — Wenderoth, Lind & Ponack, L.L.P.

(57) ABSTRACT

A speaker recognition device includes: an obtaining unit which obtains a speech uttered by a speaker included in one or more speakers; a storage which stores the speech obtained by the obtaining unit; a trigger input unit which receives a trigger; an utterance start detector which detects a start position of the speech stored in the storage, when the trigger input unit receives the trigger, the start position being a position at which utterance of the speech has started; and a speaker identification unit which identifies the speaker of the speech from the one or more speakers based on at least first timing and second timing, the first timing being timing at which the trigger input unit has received the trigger, the second timing being timing indicating the start position of the speech detected by the utterance start detector.

7 Claims, 5 Drawing Sheets

(56) References Cited

U.S. PATENT DOCUMENTS

| | | | |
|---|---|---|---|
| 2012/0253807 A1* | 10/2012 | Kamano | G10L 25/63 |
| | | | 704/240 |
| 2013/0173266 A1* | 7/2013 | Nishino | G10L 25/51 |
| | | | 704/236 |
| 2015/0370531 A1* | 12/2015 | Faaborg | G10L 15/30 |
| | | | 704/275 |
| 2017/0090864 A1* | 3/2017 | Jorgovanovic | G10L 21/0332 |
| 2018/0158462 A1 | 6/2018 | Page et al. | |
| 2019/0013019 A1* | 1/2019 | Lawrence | G06F 3/167 |
| 2019/0306401 A1* | 10/2019 | Toriumi | H04N 1/00403 |
| 2020/0103964 A1* | 4/2020 | Tanaka | G01C 21/3697 |
| 2020/0184964 A1* | 6/2020 | Myers | G10L 15/22 |
| 2020/0388285 A1* | 12/2020 | Spiewla | G06F 3/167 |

* cited by examiner

SPEECH INPUT DEVICE, SPEECH INPUT METHOD, AND RECORDING MEDIUM

CROSS REFERENCE TO RELATED APPLICATIONS

The present application is based on and claims priority of U.S. Provisional Patent Application No. 62/824,619 filed on Mar. 27, 2019 and Japanese Patent Application No. 2019-197231 filed on Oct. 30, 2019. The entire disclosures of the above-identified applications, including the specifications, drawings and claims are incorporated herein by reference in their entirety.

FIELD

The present disclosure relates to a speech input device, a speech input method, and a recording medium.

BACKGROUND

Patent Literature (PTL) 1, for example, discloses a speech recognition system including: a speech input start operating means which makes a speech input operation possible in response to an operation by a user; a speech input means which obtains a speech of a user; an utterance start time learning data holding means which holds an utterance start learning time from the time when the user performs an operation on the speech input start operating means until the time when the user actually starts utterance; and a speech recognizing means which compares a measured time with the utterance start learning time held by the utterance start time learning data holding means, to determine whether the speech whose time is measured is a speech inputted by the user, and performs speech recognition when the speech whose time is measured is the speech inputted by the user.

This speech recognition system learns an utterance start time for each user, and uses the utterance start time to recognize whether a speech is the speech of the user.

CITATION LIST

Patent Literature

PTL 1: Japanese Unexamined Patent Application Publication No. 2006-313261

SUMMARY

Technical Problem

The technique disclosed in PTL 1, however, requires learning, in advance, of a period from the time when the user operates a speech input device to the time when the user actually starts utterance. As a consequence, the conventional speech recognition system may cause an increase in the amount of calculation due to the learning.

In view of the above circumstances, the present disclosure provides a speech input device, a speech input method, and a recording medium that are capable of reducing an increase in the amount of calculation by identifying a speaker with simple processing.

Solution to Problem

A speech input device according to an aspect of the present disclosure is a speech input device including: an obtaining unit which obtains a speech uttered by a speaker included in one or more speakers; a storage which stores the speech obtained by the obtaining unit; a trigger input unit which receives a trigger; an utterance start detector which detects a start position of the speech stored in the storage, when the trigger input unit receives the trigger, the start position being a position at which utterance of the speech has started; and a speaker identification unit which identifies the speaker of the speech from the one or more speakers based on at least first timing and second timing, the first timing being timing at which the trigger input unit has received the trigger, the second timing being timing indicating the start position of the speech detected by the utterance start detector.

Note that some of general and specific aspects described above may be implemented using a system, a method, an integrated circuit, a computer program, or a computer-readable recording medium such as a CD-ROM (compact disc read-only memory), or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

A speech input device and the related technologies according to the present disclosure are capable of reducing an increase in the amount of calculation by identifying the speaker with simple processing.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENT

Figure 1:
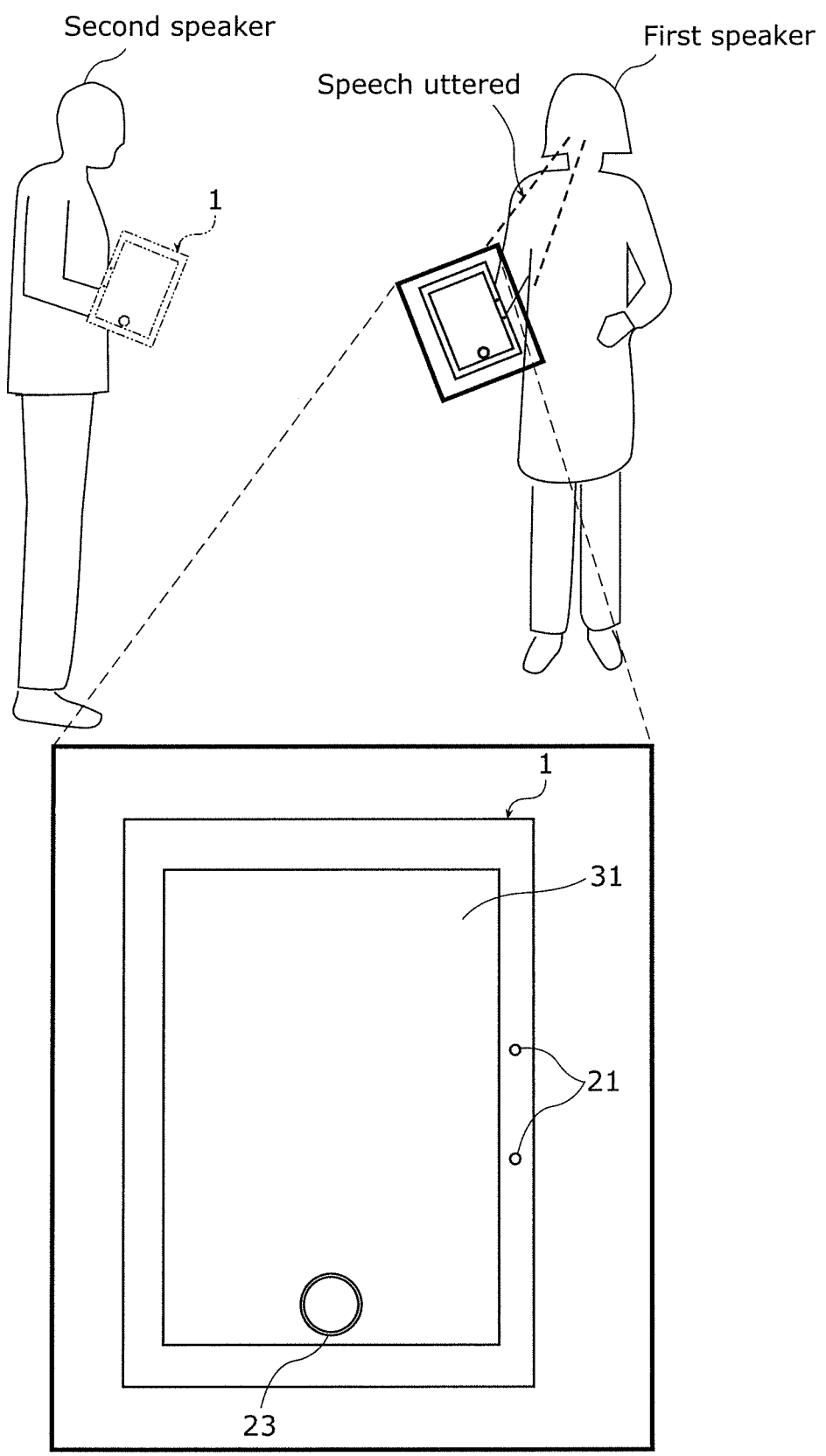
FIG. 1 illustrates an example of the external appearance of a speaker recognition device according to an embodiment and an example of a scene where the speaker recognition device is used by speakers uttering speeches.

A speech input device according to an aspect of the present disclosure is a speech input device including: an obtaining unit which obtains a speech uttered by a speaker included in one or more speakers; a storage which stores the speech obtained by the obtaining unit; a trigger input unit which receives a trigger; an utterance start detector which detects a start position of the speech stored in the storage, when the trigger input unit receives the trigger, the start position being a position at which utterance of the speech has started; and a speaker identification unit which identifies the speaker of the speech from the one or more speakers based on at least first timing and second timing, the first timing being timing at which the trigger input unit has received the trigger, the second timing being timing indicating the start position of the speech detected by the utterance start detector.

This makes it possible to identify the speaker of a speech from one or more speakers based on, for example, a temporal relationship between the first timing at which a trigger inputted by a speaker included in one or more speakers has been detected and the second timing at which the speaker of the speech has started to utter the speech. That is to say, it is possible to identify the speaker of the speech obtained by the obtaining unit, from one or more speakers, without having to learn the period between the first timing and the second timing.

Accordingly, by identifying the speaker with simple processing, the speech input device can reduce an increase in the amount of calculation.

In particular, the speech input device can identify the speaker of a speech based on the timing of utterance of the speech with respect to the first timing. Therefore, the speech input device can identify the speaker of a speech with a simple operation. Moreover, since the operation on the speech input device is simplified, it is possible to inhibit increased complication of the speech input device, such as provision of a plurality of buttons to the speech input device. Accordingly, when the trigger input unit is, for example, a button, the speech input device can identify the speaker of the speech from one or more speakers even with a single button, and thus, it is possible to simplify the configuration of the speech input device.

A speech input method according to another aspect of the present disclosure is a speech input method including: obtaining a speech uttered by a speaker included in one or more speakers; storing, in a storage, the speech obtained; receiving a trigger; detecting a start position of the speech stored in the storage, when the trigger is received, the start position being a position at which utterance of the speech has started; and identifying the speaker of the speech from the one or more speakers based on at least first timing and second timing, the first timing being timing at which the trigger has been received, the second timing being timing indicating the start position of the speech detected.

This speech input method yields the same advantageous effects as those of the speech input device described above.

A recording medium according to another aspect of the present disclosure is a non-transitory computer-readable recording medium for use in a computer, the recording medium having a computer program recorded thereon for causing the computer to execute the speech input method.

This recording medium yields the same advantageous effects as those of the speech input device described above.

The speech input device according to another aspect of the present disclosure includes an utterance timing registration unit which registers at least which one of the first timing and the second timing is earlier, and the speaker identification unit identifies the speaker of the speech from the one or more speakers based on the first timing, the second timing, and plural items of registration information registered by the utterance timing registration unit and each indicating a temporal position of the second timing with respect to the first timing.

This makes it possible to register in advance the temporal relationship between the first timing and the second timing, as a condition desired by one or more speakers. Therefore, the speaker identification unit can identify the speaker of a speech from one or more speakers by merely determining whether the temporal relationship between the first timing and the second timing is indicated in the registration information. As a result, the speech input device can more reliably identify the speaker with simple processing.

In the speech input device according to another aspect of the present disclosure, when registering timing of utterance for each of the one or more speakers, the utterance timing registration unit: registers first registration information which is registration information associating first time information with a speaker included in the one or more speakers, the first time information indicating that the second timing which indicates the start position is later than the first timing at which the trigger input unit receives the trigger; and registers second registration information which is registration information associating second time information with an other speaker included in the one or more speakers, the second time information indicating that the second timing which indicates the start position is earlier than the first timing at which the trigger input unit receives the trigger.

This makes it possible for a speaker to register a condition that a trigger is inputted before a speaker starts utterance of a speech, and a condition that a trigger is inputted after a speaker starts utterance of a speech. By the speaker registering one or more conditions in advance in such a manner, the speech input device can simply and reliably identify the speaker without any learning.

In the speech input device according to another aspect of the present disclosure, the speaker identification unit: calculates the temporal position of the second timing with respect to the first timing; and checks a calculation result indicating the temporal position calculated, against the plural items of registration information, and determines that (i) the speaker of the speech is a first speaker when the second timing is later than the first timing, and (ii) the speaker of the speech is a second speaker different from the first speaker when the second timing is earlier than the first timing.

This makes it possible for the speaker identification unit to calculate, based on the first timing at which the trigger input unit has received a trigger and the second timing detected by the utterance start detector, the temporal position of the second timing with respect to the first timing. With this, the speaker identification unit can calculate a result indicating the temporal position of the second timing with respect to the timing, that is, a result indicating whether the second timing is earlier than the first timing or later than the first timing. As a result, the speaker identification unit can more reliably identify the speaker of a speech from one or more speakers, by comparing the calculation result indicating the temporal position calculated with plural items of registration information.

Even when there are two or more speakers, registration of, for example, a period between the first timing and the second timing enables identification of the speaker of a speech.

In the speech input device according to another aspect of the present disclosure, the trigger input unit is a speech input interface which receives a pre-set speech, and the trigger input unit receives the pre-set speech as the trigger.

Accordingly, mere utterance of a pre-set speech such as a wake-up word by a speaker enables the speech input device to perform magic word recognition and speaker recognition. Thus, the speech input device has excellent usability.

In the speech input device according to another aspect of the present disclosure, the trigger input unit is an operation button provided to the speech input device, and the trigger input unit receives an operation as the trigger.

Accordingly, by having a speaker operate the trigger input unit, it is possible to reliably input a trigger to the trigger input unit.

Note that some of general or specific aspects disclosed above may be implemented using a system, a method, an integrated circuit, a computer program, or a computer-readable recording medium such as a CD-ROM, or any combination of systems, methods, integrated circuits, computer programs, or computer-readable recording media.

The exemplary embodiment described below shows a specific example of the present disclosure. The numerical values, shapes, materials, structural elements, the arrangement and connection of the structural elements, steps, the processing order of the steps etc. shown in the following exemplary embodiment are mere examples, and therefore do not limit the scope of the appended Claims and their equivalents. Therefore, among the structural elements in the following exemplary embodiment, structural elements not recited in any one of the independent claims are described as optional structural elements. Moreover, exemplary embodiments may be combined.

Hereinafter, a speech input device, a speech input method, and a recording medium according to an aspect of the present disclosure will be described in greater detail with reference to the accompanying Drawings.

Embodiment

<Configuration: Speaker Recognition Device 1>

FIG. 1 illustrates an example of the external appearance of speaker recognition device 1 according to the embodiment and an example of a scene where speaker recognition device 1 is used by speakers uttering speeches. FIG. 1 illustrates an example of a scene where a plurality of speakers share speaker recognition device 1 and use speaker recognition device 1 when uttering speeches.

As illustrated in FIG. 1, speaker recognition device 1 obtains a speech uttered by a speaker included in one or more speakers, and identifies the speaker of the speech from the one or more speakers based on the speech obtained. In other words, speaker recognition device 1 obtains each of speeches uttered by one or more speakers, and identifies the speaker for each speech obtained. Speaker recognition device 1 is an example of the speech input device.

Note that speaker recognition device 1 may obtain a conversation between conversation partners, and identify a speaker of a speech from the conversation partners based on the conversation obtained.

In the present embodiment, speaker recognition device 1 obtains each of speeches uttered by one or more speakers, and identifies the speaker of each speech based on timing of the speech and timing of a trigger inputted.

In the present embodiment, FIG. 1 illustrates a scene where a plurality of speakers, namely a first speaker and a second speaker, use speaker recognition device 1 and each speaker utters a speech. For example, after speech recognition is performed for the first speaker, the second speaker may use speaker recognition device 1 illustrated with a two-dot chain line. That is to say, the first speaker and the second speaker may each use speaker recognition device 1 at different times or different occasions, and may use speaker recognition device 1 at the same time when having a conversation between themselves. The first speaker and the second speaker are each an example of a speaker. Note that the second speaker may be a conversation partner of the first speaker.

Here, the first speaker and the second speaker may speak the same language, or may speak different languages. In this case, speaker recognition device 1 identifies the speaker as the first speaker or the second speaker for each speech uttered in a first language that the first speaker speaks or a second language that the second speaker speaks and is the same as or different from the first language. For example, the first language and the second language are Japanese, English, French, German, Chinese, etc.

In the present embodiment, the first speaker is the owner of speaker recognition device 1, and it is mainly the first speaker who inputs a trigger to speaker recognition device 1 and registers timing of utterance by a speaker with respect to timing of trigger input. That is to say, the first speaker is the user of speaker recognition device 1 who knows how to operate speaker recognition device 1. In the present embodiment, when a trigger is inputted to speaker recognition device 1 and then a speaker utters a speech, speaker recognition device 1 recognizes that the speaker of the speech is the first speaker, for example. When another speaker utters a speech and then a trigger is inputted to speaker recognition device 1, speaker recognition device 1 recognizes that the speaker of the speech is the second speaker, for example.

Speaker recognition device 1 is a mobile terminal such as a smartphone or a tablet terminal which can be carried by the first speaker.

Figure 2A:
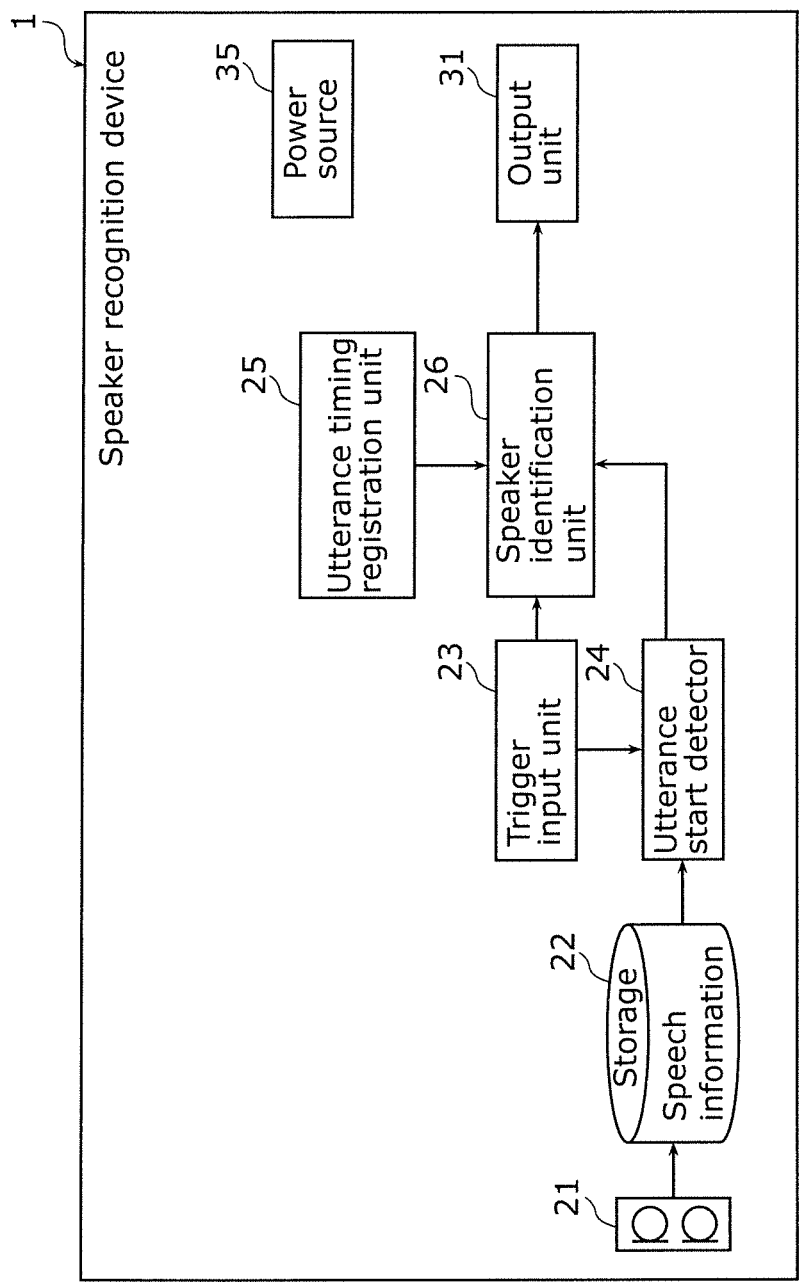
FIG. 2A is a block diagram illustrating an example of the speaker recognition device according to the embodiment.

FIG. 2A is a block diagram illustrating speaker recognition device 1 according to the embodiment.

As illustrated in FIG. 2A, speaker recognition device 1 includes utterance timing registration unit 25, obtaining unit 21, storage 22, trigger input unit 23, utterance start detector 24, speaker identification unit 26, output unit 31, and power source 35.

[Utterance Timing Registration Unit 25]

Utterance timing registration unit 25 registers at least which one of first timing and second timing is earlier. Specifically, utterance timing registration unit 25 is a registration device which registers, for each of one or more speakers, timing of utterance of a speech with respect to timing of trigger input.

A desired condition is set according to an operation by one or more speakers, and utterance timing registration unit 25 can register the set condition. Specifically, when registering timing of utterance for each of one or more speakers, utterance timing registration unit registers first registration information which is registration information associating first time information with a speaker included in one or more speakers. Here, the first time information indicates that the second timing, which indicates the start position of utterance of a speech, is later than the first timing at which trigger input unit 23 receives a trigger. In a specific example, a speaker sets a condition that the first speaker starts utterance after a trigger is inputted to trigger input unit 23, and utterance timing registration unit 25 registers first registration information which associates first time information indicating the set condition, with label A.

Utterance timing registration unit 25 includes a memory which stores the first registration information registered.

Note that the first registration information registered by utterance timing registration unit 25 may be stored in storage 22.

Furthermore, when registering timing of utterance for each of one or more speakers, utterance timing registration unit 25 registers second registration information which is registration information associating second time information with another speaker included in one or more speakers. Here, the second time information indicates that the second timing, which indicates the start position of utterance of a speech, is earlier than the first timing at which trigger input unit 23 receives a trigger. In a specific example, a speaker sets a condition that the second speaker starts utterance before a trigger is inputted to trigger input unit 23, and utterance timing registration unit 25 registers second registration information which associates second time information indicating the set condition, with label B. Utterance timing registration unit 25 includes a memory which stores the second registration information registered. Note that the second registration information registered by utterance timing registration unit 25 may be stored in storage 22.

For example, if the first speaker decides to utter a speech under the condition indicated in the first registration information and set with label A, and the first speaker asks the second speaker to speak under the condition indicated in the second registration information and set with label B (given that such conditions are determined in advance between the first speaker and the second speaker), different speakers can speak under different conditions. Accordingly, by utterance timing registration unit 25 registering conditions of utterance for individual speakers, the conditions serve as the bases for the speaker identification performed by speaker identification unit 26.

Utterance timing registration unit 25 outputs a plurality of items of registration information, that is, for example, the first registration information and the second registration information, to speaker identification unit 26.

Note that utterance timing registration unit 25 can set a period from the first timing at which a trigger is inputted to trigger input unit 23 to the second timing at which a speaker starts utterance of a speech. That is to say, utterance timing registration unit 25 may register, as the registration information, a condition that a speaker starts utterance  seconds or at least  seconds after the first timing at which a trigger is inputted to trigger input unit 23. Utterance timing registration unit 25 may also register, as the registration information, a condition that a trigger is inputted to trigger input unit 23  seconds or at least  seconds after a speaker starts utterance. In other words, utterance timing registration unit 25 may: set the second timing to the timing of  seconds or at least  seconds after the first timing; set the first timing to the timing of  seconds or at least  seconds after the second timing; and register the set information as the registration information. Here, "**" is any given number, and does not necessarily indicate the same length of time.

Note that utterance timing registration unit 25 may register, as the registration information, a time length of a continuous trigger input to trigger input unit 23. For example, in the case where trigger input unit 23 is an operation button, and utterance timing registration unit 25 also registers a time length for which the operation button is held down (a time length for which a trigger is continuously inputted to trigger input unit 23) according to timing at which a speaker starts utterance of a speech, the registered time length for which the operation button is held down can be used as the basis for the speaker identification performed by speaker identification unit 26.

For example, utterance timing registration unit 25 may register, as the registration information, a condition that a trigger is continuously inputted to trigger input unit 23 for  seconds from the timing of  seconds or at least  seconds after the first timing at which a trigger is inputted to trigger input unit 23. Utterance timing registration unit 25 may also register, as the registration information, a condition that a trigger is continuously inputted to trigger input unit 23 for  seconds from the timing of  seconds or at least  seconds after a speaker starts utterance.

[Obtaining Unit 21]

Obtaining unit 21 obtains a speech uttered by a speaker included in one or more speakers. That is to say, obtaining unit 21 obtains a speech uttered by a speaker included in one or more speakers, converts the obtained speech into a speech signal, and outputs the speech signal to storage 22.

Obtaining unit 21 is a microphone unit which obtains a speech signal by converting a speech into a speech signal. Note that obtaining unit 21 may be an input interface electrically connected with a microphone. That is to say, obtaining unit 21 may obtain a speech signal from the microphone. Obtaining unit 21 may be a microphone array unit composed of a plurality of microphones. Since obtaining unit 21 is sufficient as long as it is capable of picking up a speech of a speaker present in the vicinity of speaker recognition device 1, the location of obtaining unit 21 in speaker recognition device 1 is not particularly limited.

[Storage 22]

Storage 22 stores speech information on the speech which has been uttered by a speaker included in one or more speakers and obtained by obtaining unit 21. Specifically, storage 22 stores speech information on the speech indicated by the speech signal obtained from obtaining unit 21. That is to say, storage 22 automatically stores speech information on the speech uttered by the speaker included in one or more speakers.

Storage 22 resumes recording upon startup of speaker recognition device 1. Storage 22 may start recording when a speaker initially inputs a trigger to input unit 23 after startup of speaker recognition device 1. That is to say, storage 22 may start recording a speech in response to the initial trigger input to input unit 23 by a speaker. Furthermore, storage 22 may cancel or stop recording a speech in response to a trigger inputted to input unit 23.

Due to the limited capacity of storage 22, the speech information stored in storage 22 may be deleted automatically in chronological order when a specified capacity is reached. That is to say, the speech information may be added with a speech of a speaker and information indicating a date and time (a time stamp). Storage deletes old speech information based on the information indicating a date and time.

Storage 22 may include a hard disk drive (HDD) or a semiconductor memory, for example.

[Trigger Input Unit 23]

Trigger input unit 23 receives a trigger from a speaker. In a specific example, trigger input unit 23 receives an input of a pre-set trigger from a speaker before the first speaker utters a speech, for example. Trigger input unit 23 also receives an input of a pre-set trigger from a speaker after the second speaker starts to utter a speech, for example. That is to say, in the case where the speaker of a speech is the first speaker, trigger input unit 23 receives a trigger before the first speaker utters a speech, whereas in the case where the speaker of a speech is the second speaker, trigger input unit 23 receives a trigger after the second speaker starts to utter a speech. Trigger input unit 23 receives a trigger from a speaker for every speech of one or more speakers.

Note that storage 22 may start recording a speech and may cancel or stop recording a speech in response to an operation on trigger input unit 23 by a speaker.

Upon detecting the trigger received, trigger input unit 23 generates an input signal, and outputs the generated input signal to utterance start detector 24 and speaker identification unit 26. The input signal includes information indicating the first timing (a time stamp).

In the present embodiment, trigger input unit 23 is one operation button provided to speaker recognition device 1. In this case, trigger input unit 23 receives, as the trigger, an operation of a speaker pressing the operation button. That is to say, the trigger in the present embodiment is an input signal inputted by a speaker performing an operation on trigger input unit 23. Note that speaker recognition device 1 may include two or more trigger input units 23.

Note that trigger input unit 23 may be a touch sensor integrated with display 33 of speaker recognition device 1. In this case, display 33 of speaker recognition device 1 may display trigger input unit 23 which is an operation button that receives an operation by a speaker.

Figure 2B:
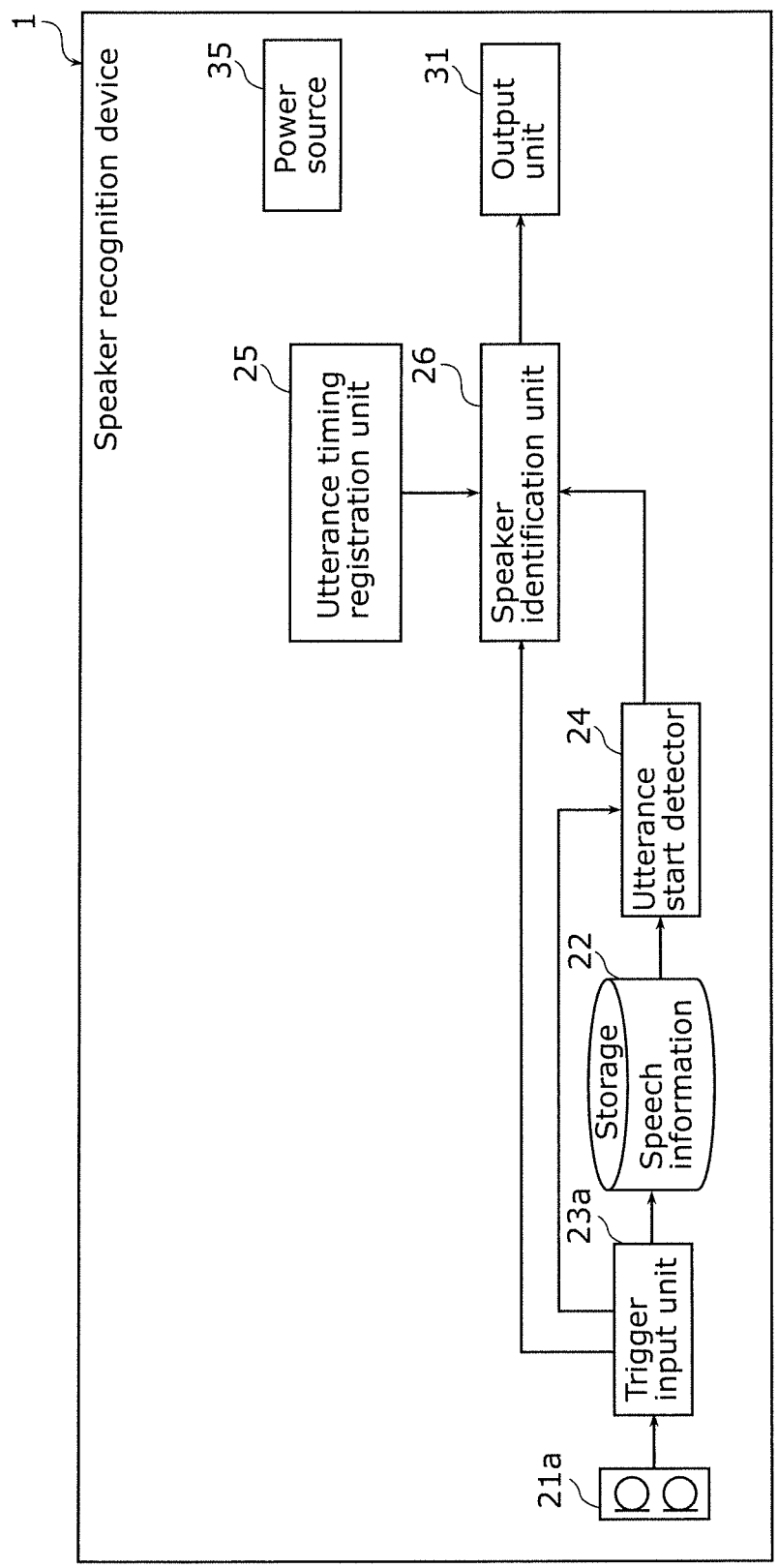
FIG. 2B is a block diagram illustrating another example of the speaker recognition device according to the embodiment.

FIG. 2B is a block diagram illustrating another example of speaker recognition device 1 according to the embodiment.

As illustrated in FIG. 2B, trigger input unit 23a may be a speech input interface which receives an input of a pre-set speech. In this case, trigger input unit 23a receives a pre-set speech as a trigger via obtaining unit 21a. Specifically, the trigger in this case is an input signal in the form of a speech uttered by a speaker and inputted to trigger input unit 23a. Here, the pre-set speech is a wake-up word, for example. In the case of setting a condition that, for example, the speaker is the first speaker when the wake-up word is "OK! ##, x x", and the speaker is the second speaker when the wake-up word is "##, OK! x x", speaker recognition device 1 identifies the speaker as the first speaker when the speaker utters "OK! ##, x x", and identifies the speaker as the second speaker when the speaker utters "##, OK! x x". Note that when trigger input unit 23a is a speech input interface, it is possible to reliably identify the speaker of a speech from the first speaker and the second speaker by presetting a speech for each speaker.

[Utterance Start Detector 24]

As illustrated in FIG. 1 and FIG. 2A, utterance start detector 24 is a detection device which detects the start position of a speech stored in storage 22, when trigger input unit 23 receives a trigger. Here, the start position of a speech is the position (timing) at which utterance of the speech has started.

Specifically, utterance start detector 24 detects the start position of, among one or more speeches the speech information on which is stored in storage 22, a speech which: has been uttered by the first speaker in a specified period starting at the first timing at which input unit 23 has received a trigger from a speaker; and is indicated in the speech information stored as a result of the first speaker uttering the speech. In other words, speech start detector 24 detects, from the specified period starting at the first timing at which trigger input unit 23 has detected an input of a trigger, the start position of the speech of the first speaker, that is, the second timing at which utterance of the speech of the first speaker has started.

Utterance start detector 24 also detects the start position of, among one or more speeches the speech information on which is stored in storage 22, a speech which: the second speaker has started to utter in a specified period ending at the first timing at which input unit 23 has received a trigger from a speaker; and is indicated in the speech information stored as a result of the second speaker uttering the speech. In other words, speech start detector 24 detects, from the specified period ending at the first timing, the start position of the speech of the second speaker, that is, the second timing at which utterance of the speech of the second speaker has started.

Utterance start detector 24 generates, for each speech, start position information indicating the start position of the speech, and outputs the generated start position information to speaker identification unit 26. The start position information is information indicating the start position of a speech uttered by a speaker, that is, the timing at which utterance of the speech has started (a time stamp).

[Speaker Identification Unit 26] Speaker identification unit 26 is a device which identifies the speaker of a speech from one or more speakers based on: the first timing at which trigger input unit 23 has received a trigger; second timing which indicates the start position of the speech detected by utterance start detector 24; and plural items of registration information registered by utterance timing registration unit 25 and each indicating a temporal position of the second timing with respect to the first timing.

Specifically, upon obtaining the input signal indicating the first timing from trigger input unit 23, and obtaining the start position information from utterance start detector 24, speaker identification unit 26 calculates the temporal position of the second timing with respect to the first timing. In other words, speaker identification unit 26 compares the first timing indicated by the input signal and the second timing indicated by the start position information, and calculates a temporal relationship between the first timing and the second timing. The result of calculation performed by speaker identification unit 26 indicates the temporal position of the second timing with respect to the first timing.

Furthermore, upon obtaining the registration information from utterance timing registration unit 25, speaker identification unit 26 checks the calculation result indicating the temporal position of the second timing with respect to the first timing, against the plural items of registration information, and identifies the speaker of the speech as the first speaker when the second timing is later than the first timing. When the check of the calculation result indicating the temporal position against the plural items of registration information shows that the second timing is earlier than the first timing, speaker identification unit 26 identifies the speaker of the speech as the second speaker.

More specifically, speaker identification unit 26 identifies the speaker for each speech uttered by one or more speakers in a specified period before or after the first timing at which trigger input unit 23 has received a trigger. With the first timing serving as a reference point, speaker identification unit 26 selects, from one or more speeches stored in storage 22, a speech most recently uttered by a speaker (the latest speech) in a specified period ending at the first timing or in a specified period starting at the first timing. Speaker identification unit 26 identifies the speaker of the speech selected.

Here, the specified period may be, for example, a few seconds such as 1 or 2 seconds, or may be 10 seconds, for example. Accordingly, speaker identification unit 26 identifies the speaker based on the first timing and the second timing of each of the most recent speeches of one or more speakers. This is to prevent speaker identification unit 26 from inaccurately identifying the speaker of the most recent speech, because the speaker identification becomes inaccurate if the identification is based on a speech that is too old.

Speaker identification unit 26 outputs, to output unit 31, result information which includes the result of the speaker identification. The result information includes information indicating the speaker identified from one or more speakers. For example, the result information includes: information indicating that the speaker of a speech indicated in the speech information stored as a result of the speaker uttering the speech is identified as the first speaker; or information indicating that the speaker of a speech indicated in the speech information stored as a result of the speaker uttering the speech is identified as the second speaker.

[Display 33]

Display 33 is, for example, a monitor such as a liquid crystal panel or an organic electroluminescent (EL) panel. Display 33 displays, in the form of text, the speaker indicated in the result information obtained from speaker identification unit 26. When a speaker utters a speech, display 33 presents a display indicating that the speaker who has uttered the speech is the first speaker, for example. Furthermore, when a speaker utters a speech, display 33 presents a display indicating that the speaker who has uttered the speech is the second speaker, for example. Display 33 is an example of output unit 31.

Note that speaker recognition device 1 may include a sound output unit. In this case, the sound output unit may be a loudspeaker which outputs a sound indicating the speaker indicated by the result information obtained from speaker identification unit 26. That is to say, when a speaker utters a speech and the result information indicates that the speaker of the speech is the first speaker, the sound output unit outputs a sound indicating that the speaker of the speech is the first speaker. Furthermore, when a speaker utters a speech and the result information indicates that the speaker of the speech is the second speaker, the sound output unit outputs a sound indicating that the speaker of the speech is the second speaker. The sound output unit is an example of output unit 31.

[Power Source 35]

Power source 35 is a primary cell or a secondary cell, for example, and is electrically connected with utterance timing registration unit 25, obtaining unit 21, storage 22, trigger input unit 23, utterance start detector 24, speaker identification unit 26, output unit 31, etc. via a line. Power source 35 supplies power to utterance timing registration unit 25, obtaining unit 21, storage 22, trigger input unit 23, utterance start detector 24, speaker identification unit 26, output unit 31, etc.

<Operation>

An operation of speaker recognition device 1 having the above configuration will be described.

Figure 3:
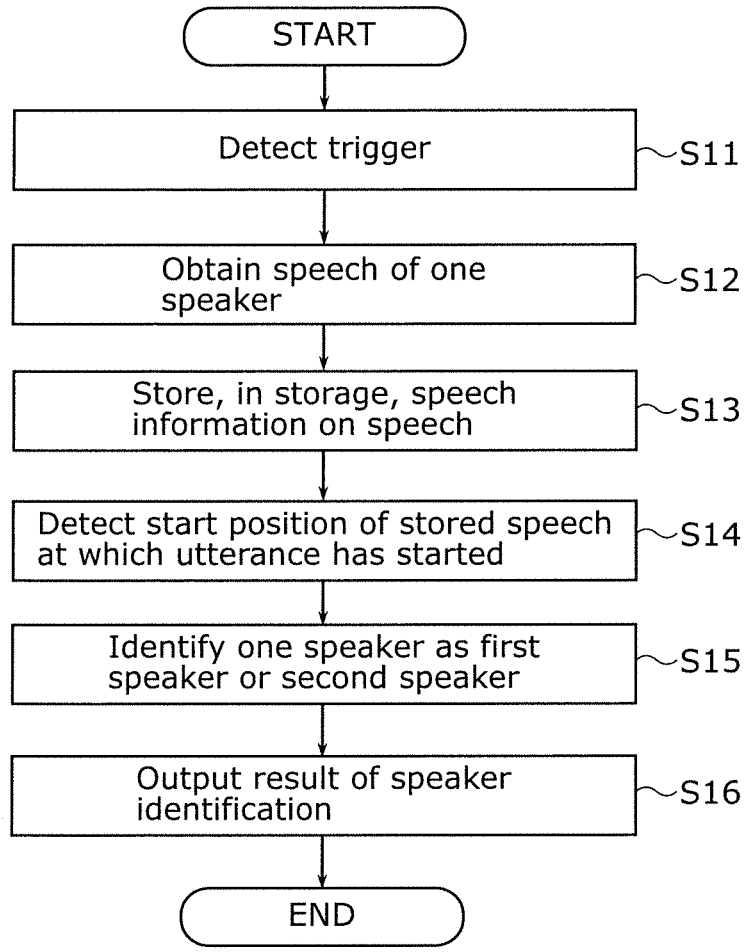
FIG. 3 is a flow chart illustrating an operation of the speaker recognition device performed when a first speaker utters a speech.
Figure 4:
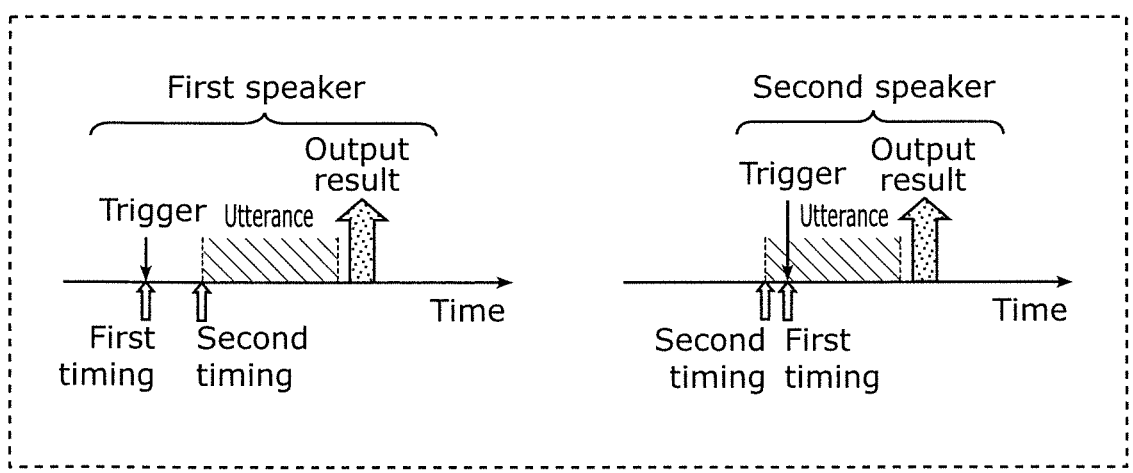
FIG. 4 illustrates an example of a time series indicating first timing and second timing of a speech uttered by the first speaker, and a time series indicating first timing and second timing of a speech uttered by a second speaker.

FIG. 3 is a flow chart illustrating an operation of speaker recognition device 1 performed when the first speaker utters a speech. FIG. 4 illustrates an example of a time series indicating first timing and second timing of a speech uttered by the first speaker, and a time series indicating first timing and second timing of a speech uttered by the second speaker.

FIG. 3 and FIG. 4 assume that the first registration information which associates the first time information with label A is registered in the memory included in utterance timing registration unit 25. Here, the first time information is information indicating the condition that the first speaker starts utterance after a speaker inputs a trigger to trigger input unit 23. FIG. 3 and FIG. 4 also assume that the second registration information which associates the second time information with label B is registered in the memory included in utterance timing registration unit 25. Here, the second time information is information indicating the condition that the second speaker starts utterance before a speaker inputs a trigger to trigger input unit 23.

As illustrated in FIG. 2A, FIG. 3, and FIG. 4, first, trigger input unit 23 receives a trigger for obtaining unit 21 to start obtaining a speech. In other words, trigger input unit 23 receives a pre-set trigger from a speaker before one speaker starts to utter a speech. Accordingly, trigger input unit 23 detects the trigger inputted by a speaker (S11). Upon detecting the input of the trigger, trigger input unit 23 generates an input signal, and outputs the generated input signal to utterance start detector 24 and speaker identification unit 26.

Next, obtaining unit 21 obtains a speech uttered by the one speaker (S12). Obtaining unit 21 converts the obtained speech uttered by the one speaker into a speech signal, and outputs the speech signal to storage 22.

Next, storage 22 stores speech information on the speech indicated by the speech signal obtained by obtaining unit 21 (S13). That is to say, storage 22 automatically stores speech information on the most recent speech of the one speaker.

Next, upon obtaining the input signal from trigger input unit 23, utterance start detector 24 detects the start position (second timing) of the speech indicated in the speech information stored in storage 22, that is, detects the start position at which utterance of the speech has started (S14). Specifically, utterance start detector 24 detects the start position of the speech which the one speaker has started to utter immediately after a speaker inputted a trigger to trigger input unit 23 and which is indicated in the speech information stored as a result the one speaker uttering the speech. Utterance start detector 24 generates start position information indicating the start position of the speech, and outputs the generated start position information to speaker identification unit 26.

Next, speaker identification unit 26 identifies the speaker of the speech as the first speaker or the second speaker based on: the first timing at which trigger input unit 23 has received the trigger; the second timing which indicates the start position of the speech detected by utterance start detector 24; and plural items of registration information registered by utterance timing registration unit 25 and each indicating a temporal position of the second timing with respect to the first timing (S15). In the case of FIG. 3, the first timing is earlier than the second timing, and thus, speaker identification unit 26 identifies the speaker of the speech indicated in the start position information (the speaker of the uttered speech) as the first speaker. That is to say, speaker identification unit 26 identifies the one speaker as the first speaker.

Next, speaker identification unit 26 outputs, to output unit 31, result information including the result that the one speaker has been identified as the first speaker (S16).

Speaker recognition device 1 then finishes the processing.

Figure 5:
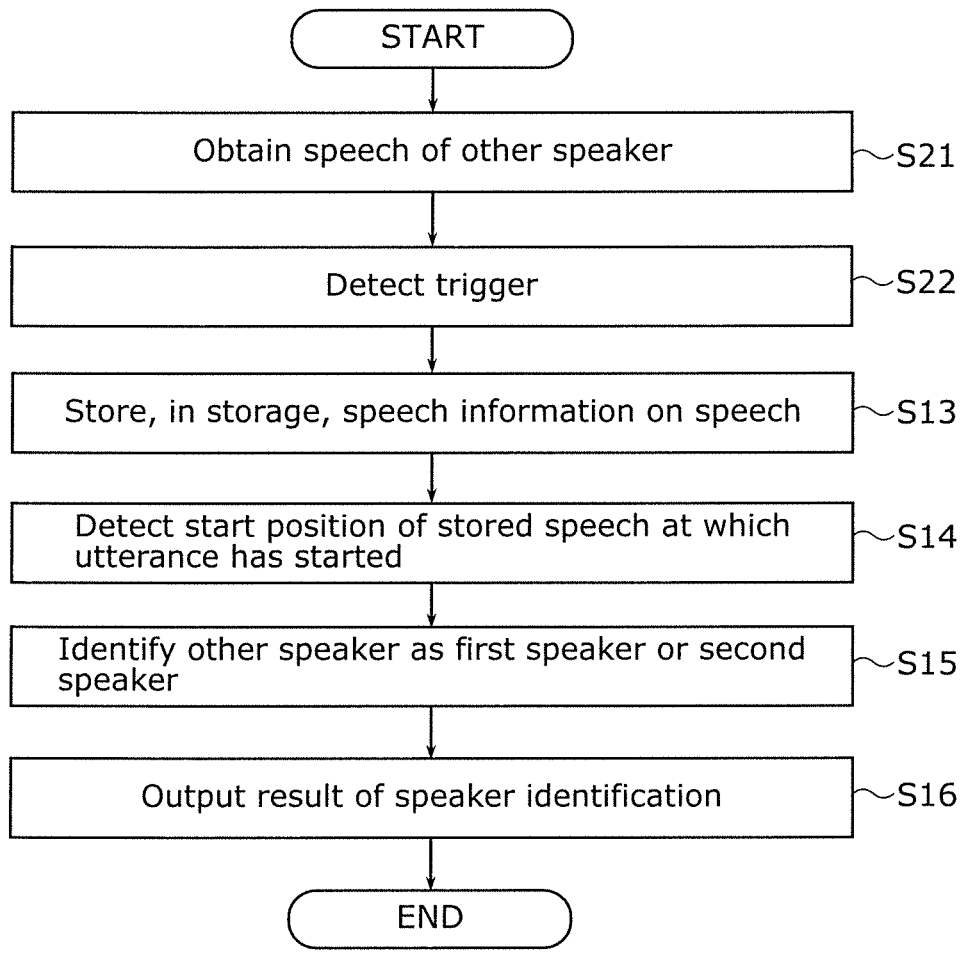
FIG. 5 is a flow chart illustrating an operation of the speaker recognition device performed when the second speaker utters a speech.

FIG. 5 is a flow chart illustrating an operation of speaker recognition device 1 performed when the second speaker utters a speech. Description of the processing common to FIG. 3 will be omitted as appropriate.

As illustrated in FIG. 2A, FIG. 4, and FIG. 5, first, obtaining unit 21 obtains a speech uttered by the other speaker (S21). Obtaining unit 21 converts the obtained speech uttered by the other speaker into a speech signal, and outputs the speech signal to storage 22.

Next, trigger input unit 23 receives a trigger for obtaining unit 21 to start obtaining a speech. In other words, trigger input unit 23 receives a pre-set trigger from a speaker after the other speaker starts to utter a speech. Accordingly, trigger input unit 23 detects the trigger inputted by a speaker (S22). Upon detecting the input of the trigger, trigger input unit 23 generates an input signal, and outputs the generated input signal to utterance start detector 24 and speaker identification unit 26.

Next, storage 22 stores speech information on the speech indicated by the speech signal obtained by obtaining unit 21 (S13). That is to say, storage 22 automatically stores speech information on the most recent speech of the other speaker.

Next, upon obtaining the input signal from trigger input unit 23, utterance start detector 24 detects the start position (second timing) of the speech indicated in the speech information stored in storage 22, that is, detects the start position at which utterance of the speech has started (S14). Specifically, utterance start detector 24 detects the start position of the speech which the other speaker had started to utter immediately before a speaker has inputted a trigger to trigger input unit 23 and which is indicated in the speech information stored as a result the other speaker uttering the speech. Utterance start detector 24 generates start position information indicating the start position of the speech, and outputs the generated start position information to speaker identification unit 26.

Next, speaker identification unit 26 identifies the speaker of the speech as the first speaker or the second speaker based on: the first timing at which trigger input unit 23 has received the trigger; the second timing which indicates the start position of the speech detected by utterance start detector 24; and plural items of registration information registered by utterance timing registration unit 25 and each indicating a temporal position of the second timing with respect to the first timing (S15). In the case of FIG. 5, the second timing is earlier than the first timing, and thus, speaker identification unit 26 identifies the speaker of the speech indicated in the start position information as the second speaker. That is to say, speaker identification unit 26 identifies the other speaker as the second speaker.

Next, speaker identification unit 26 outputs, to output unit 31, result information including the result that the other speaker has been identified as the second speaker (S16).

Speaker recognition device 1 then finishes the processing.

Figure 6:
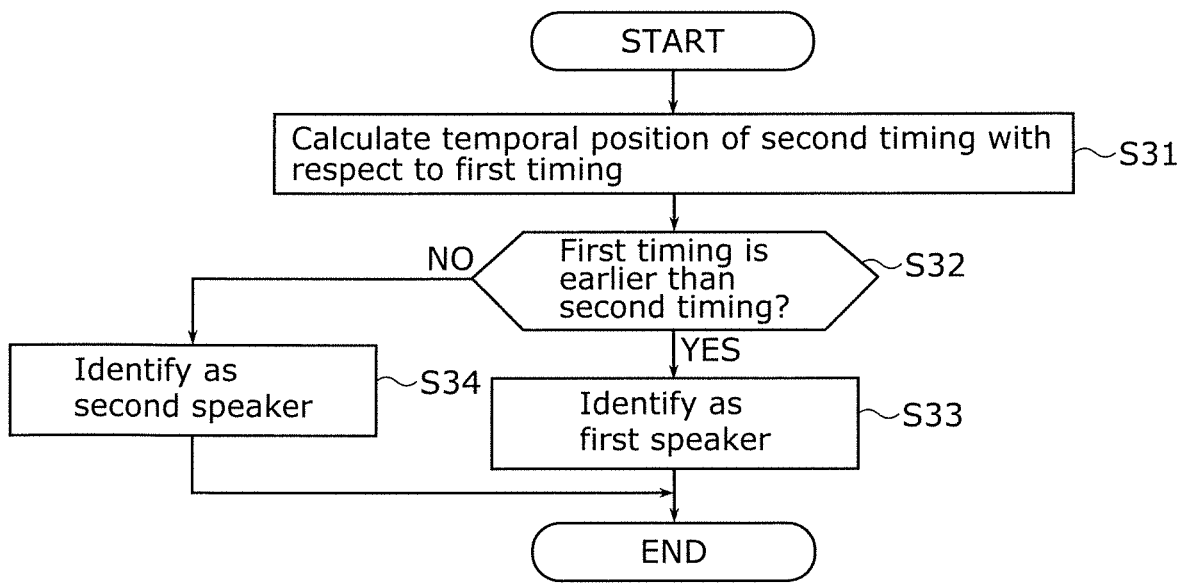
FIG. 6 is a flow chart illustrating an operation of a speaker identification unit included in the speaker recognition device according to the embodiment.

FIG. 6 is a flow chart illustrating an operation of speaker identification unit 26 included in speaker recognition device 1 according to the embodiment.

As illustrated in FIG. 3, FIG. 5, and FIG. 6, first, upon obtaining an input signal indicating the first timing from trigger input unit 23, and obtaining the start position information indicating the second timing from utterance start detector 24, speaker identification unit 26 calculates the temporal position of the second timing with respect to the first timing (S31). In other words, speaker identification unit 26 compares the first timing and the second timing, and calculates the temporal relationship between the first timing and the second timing.

Speaker identification unit 26 checks the calculation result indicating the temporal position of the second timing with respect to the first timing, against plural items of registration information, and determines whether the first timing is earlier than the second timing (S32).

When the first timing is earlier than the second timing, speaker identification unit 26 determines that it is the same as the content of the first registration information included in the plural items of registration information (YES in S32), and determines that the speaker of the speech is the first speaker (S33).

Speaker identification unit 26 outputs, to the display, result information including the result that the speaker of the speech has been identified as the first speaker from the first speaker and the second speaker. Speaker identification unit 26 then finishes the processing.

When the first timing is later than the second timing, speaker identification unit 26 determines that it is the same as the content of the second registration information included in the plural items of registration information (NO in S32), and determines that the speaker of the speech is the second speaker (S34).

Speaker identification unit 26 outputs, to the display, result information including the result that the speaker of the speech has been identified as the second speaker from the first speaker and the second speaker. Speaker identification unit 26 then finishes the processing.

Advantageous Effects

Next, advantageous effects of speaker recognition device 1 according to the present embodiment will be described.

As described above, speaker recognition device 1 according to the present embodiment includes: obtaining unit 21 which obtains a speech uttered by a speaker included in one or more speakers; storage 22 which stores the speech obtained by obtaining unit 21; trigger input unit 23 which receives a trigger; utterance start detector 24 which detects a start position of the speech stored in storage 22, when trigger input unit 23 receives the trigger, the start position being a position at which utterance of the speech has started; and speaker identification unit 26 which identifies the speaker of the speech from the one or more speakers based on at least first timing and second timing, the first timing being timing at which trigger input unit 23 has received the trigger, the second timing being timing indicating the start position of the speech detected by utterance start detector 24.

This makes it possible to identify the speaker of a speech from one or more speakers based on, for example, a temporal relationship between the first timing at which a trigger inputted by a speaker included in one or more speakers has been detected and the second timing at which the speaker of the speech has started to utter the speech. That is to say, it is possible to identify the speaker of the speech obtained by the obtaining unit, from one or more speakers, without having to learn the period between the first timing and the second timing.

Accordingly, by identifying the speaker with simple processing, speaker recognition device 1 can reduce an increase in the amount of calculation.

In particular, speaker recognition device 1 can identify the speaker of a speech based on the timing of utterance of the speech with respect to the first timing. Therefore, speaker recognition device 1 can identify the speaker of a speech with a simple operation. Moreover, since the operation on speaker recognition device 1 is simplified, it is possible to inhibit increased complication of speaker recognition device 1, such as provision of a plurality of buttons to speaker recognition device 1. Accordingly, when trigger input unit 23 is, for example, a button, speaker recognition device 1 can identify the speaker of the speech from one or more speakers even with a single button, and thus, it is possible to simplify the configuration of speaker recognition device 1.

The speech input method according to the present embodiment is a speech input method including: obtaining a speech uttered by a speaker included in one or more speakers; storing, in storage 22, the speech obtained; receiving a trigger; detecting a start position of the speech stored in storage 22, when the trigger is received, the start position being a position at which utterance of the speech has started;

and identifying the speaker of the speech from the one or more speakers based on at least first timing and second timing, the first timing being timing at which the trigger has been received, the second timing being timing indicating the start position of the speech detected.

This speech input method yields the same advantageous effects as those of speaker recognition device 1 described above.

The recording medium according to the present embodiment is a non-transitory computer-readable recording medium for use in a computer, the recording medium having a computer program recorded thereon for causing the computer to execute the speech input method.

This recording medium yields the same advantageous effects as those of speaker recognition device 1 described above.

Speaker recognition device 1 according to the present embodiment includes utterance timing registration unit 25 which registers at least which one of the first timing and the second timing is earlier. Speaker identification unit 26 identifies the speaker of the speech from the one or more speakers based on the first timing, the second timing, and plural items of registration information registered by utterance timing registration unit 25 and each indicating a temporal position of the second timing with respect to the first timing.

This makes it possible to register in advance the temporal relationship between the first timing and the second timing, as a condition desired by one or more speakers. Therefore, speaker identification unit 26 can identify the speaker of a speech from one or more speakers by merely determining whether the temporal relationship between the first timing and the second timing is indicated in the registration information. As a result, speaker recognition device 1 can more reliably identify the speaker with simple processing.

In speaker recognition device 1 according to the present embodiment, when registering timing of utterance for each of the one or more speakers, utterance timing registration unit 25: registers first registration information which is registration information associating first time information with a speaker included in the one or more speakers, the first time information indicating that the second timing which indicates the start position is later than the first timing at which trigger input unit 23 receives the trigger; and registers second registration information which is registration information associating second time information with an other speaker included in the one or more speakers, the second time information indicating that the second timing which indicates the start position is earlier than the first timing at which trigger input unit 23 receives the trigger.

This makes it possible for a speaker to register a condition that a trigger is inputted before a speaker starts utterance of a speech, and a condition that a trigger is inputted after a speaker starts utterance of a speech. By the speaker registering one or more conditions in advance in such a manner, speaker recognition device 1 can simply and reliably identify the speaker without any learning.

In speaker recognition device 1 according to the present embodiment, speaker identification unit 26: calculates the temporal position of the second timing with respect to the first timing; and checks a calculation result indicating the temporal position calculated, against the plural items of registration information, and determines that (i) the speaker of the speech is a first speaker when the second timing is later than the first timing, and (ii) the speaker of the speech is a second speaker different from the first speaker when the second timing is earlier than the first timing.

This makes it possible for speaker identification unit 26 to calculate, based on the first timing at which trigger input unit 23 has received a trigger and the second timing detected by utterance start detector 24, the temporal position of the second timing with respect to the first timing. With this, speaker identification unit 26 can calculate a result indicating the temporal position of the second timing with respect to the timing, that is, a result indicating whether the second timing is earlier than the first timing or later than the first timing. As a result, speaker identification unit 26 can more reliably identify the speaker of a speech from one or more speakers, by comparing the calculation result indicating the temporal position calculated with plural items of registration information.

Even when there are two or more speakers, registration of, for example, a period between the first timing and the second timing enables identification of the speaker of a speech.

In speaker recognition device 1 according to the present embodiment, trigger input unit 23 is a speech input interface which receives a pre-set speech. Trigger input unit 23 receives the pre-set speech as the trigger.

Accordingly, mere utterance of a pre-set speech such as a wake-up word by a speaker enables speaker recognition device 1 to perform magic word recognition and speaker recognition. Thus, speaker recognition device 1 has excellent usability.

In speaker recognition device 1 according to the present embodiment, trigger input unit 23 is an operation button provided to speaker recognition device 1. Trigger input unit 23 receives an operation as the trigger.

Accordingly, by having a speaker operate trigger input unit 23, it is possible to reliably input a trigger to trigger input unit 23.

VARIATIONS, ETC.

The present disclosure has been described above based on an exemplary embodiment; however, the present disclosure is not limited to the exemplary embodiment, etc.

For example, with the speech input device, speech input method, and recording medium according to the exemplary embodiment described above, the direction in which a speaker is present with respect to the speech input device may be estimated based on a speech obtained by the obtaining unit. In this case, the direction in which the sound source is present with respect to the speech input device may be estimated based on a speech of each speaker, using the obtaining unit which includes a microphone array. Specifically, the speech input device may calculate a time difference (phase difference) between speeches reaching different microphones of the obtaining unit, and estimate the direction in which the sound source is present, using a delay time estimation method, for example.

Furthermore, with the speech input device, speech input method, and recording medium according to the exemplary embodiment described above, when the speech input device, through the obtainment, by the obtaining unit, of a section in which a speaker utters a speech, detects a section of a predetermined period or longer in which the obtaining unit obtains no speech of any speakers, the speech input device may automatically cancel or stop recording.

Furthermore, the speech input method according to the exemplary embodiment described above may be implemented in the form of a program using a computer, and such a program may be stored in a storage device.

Each processing unit included in the speech input device, speech input method, and recording medium according to the exemplary embodiment described above is achieved through large-scale integration (LSI), which is typically embodied as an integrated circuit. Each processing unit may be realized as a chip, or some or all of the processing units may be realized as a chip.

An integrated circuit need not be obtained through LSI, but may be a dedicated circuit or a general-purpose processor. A field-programmable gate array (FPGA) for which programming can be performed after an LSI circuit is fabricated or a reconfigurable processor capable of reconfiguring connections and settings of circuit cells of an LSI circuit may be used, instead.

Note that in the exemplary embodiment described above, each component may be achieved by dedicated hardware or a software program suitable for each component. Each component may be achieved by a program execution unit such as a central processing unit (CPU) or a processor that reads and executes a software program recorded on a recoding medium such as a hard disk or a semiconductor memory, instead.

Numbers in the above description are examples used for specifically describing the present disclosure, and the exemplary embodiment of the present disclosure is not limited by such numbers.

The block diagrams each illustrate one example of the division of functional blocks: a plurality of functional blocks may be implemented as a single functional block, a single functional block may be broken up into a plurality of functional blocks, and part of one function may be transferred to another functional block. Functions of a plurality of functional blocks having similar functions may be processed in parallel or by time-division by a single hardware or software product.

The orders of the steps illustrated in the flow charts are mere examples used for specifically describing the present disclosure, and the orders of the steps may be different from those described above. Some of the steps may be performed at the same time as (in parallel with) another step.

Apart from the above, the present disclosure also encompasses embodiments obtained by making various modifications to the exemplary embodiment that are conceivable to a person skilled in the art, as well as embodiments implemented by arbitrarily combining components and functions in the exemplary embodiment within the scope of the essence of the present disclosure.

The herein disclosed subject matter is to be considered descriptive and illustrative only, and the appended Claims are of a scope intended to cover and encompass not only the particular embodiments disclosed, but also equivalent structures, methods, and/or uses.

INDUSTRIAL APPLICABILITY

The present disclosure is applicable to a speech input device, a speech input method, and a recording medium used for identifying the speakers of speeches uttered by a plurality of speakers.

The invention claimed is:

1. A speech input device, comprising:
    an obtaining unit which obtains a speech uttered by a speaker included in one or more speakers;
    a storage which stores the speech obtained by the obtaining unit;
    a trigger input unit which receives a trigger;
    an utterance start detector which detects a start position of the speech stored in the storage, when the trigger input unit receives the trigger, the start position being a position at which utterance of the speech has started;
    a speaker identification unit which identifies the speaker of the speech from the one or more speakers based on at least first timing and second timing, the first timing being timing at which the trigger input unit has received the trigger, the second timing being temporally different from the first timing and being timing indicating the start position of the speech detected by the utterance start detector; and
    an utterance timing registration unit which registers at least a condition indicating which one of the first timing and the second timing is earlier,
    wherein the condition is stored in one of the storage and the utterance timing registration unit, and
    the speaker identification unit identifies the speaker of the speech from the one or more speakers based on the first timing, the second timing, and plural items of registration information registered by the utterance timing registration unit and each indicating a temporal position of the second timing with respect to the first timing.

2. The speech input device according to claim 1, wherein
when registering timing of utterance for each of the one or more speakers, the utterance timing registration unit:
    registers first registration information which is registration information associating first time information with a speaker included in the one or more speakers, the first time information indicating that the second timing which indicates the start position is later than the first timing at which the trigger input unit receives the trigger; and
    registers second registration information which is registration information associating second time information with an other speaker included in the one or more speakers, the second time information indicating that the second timing which indicates the start position is earlier than the first timing at which the trigger input unit receives the trigger.

3. The speech input device according to claim 1, wherein
the speaker identification unit:
    calculates the temporal position of the second timing with respect to the first timing; and
    checks a calculation result indicating the temporal position calculated, against the plural items of registration information, and determines that (i) the speaker of the speech is a first speaker when the second timing is later than the first timing, and (ii) the speaker of the speech is a second speaker different from the first speaker when the second timing is earlier than the first timing.

4. The speech input device according to claim 1, wherein
the trigger input unit is a speech input interface which receives a pre-set speech, and
the trigger input unit receives the pre-set speech as the trigger.

5. The speech input device according to claim 1, wherein
the trigger input unit is an operation button provided to the speech input device, and
the trigger input unit receives an operation as the trigger.

6. A speech input method, comprising:
obtaining, using an obtaining unit, a speech uttered by a speaker included in one or more speakers;
storing, in a storage, the speech obtained;
receiving, using a trigger input unit, a trigger;

detecting, using an utterance start detector, a start position of the speech stored in the storage, when the trigger is received, the start position being a position at which utterance of the speech has started;

identifying, using a speaker identification unit, the speaker of the speech from the one or more speakers based on at least first timing and second timing, the first timing being timing at which the trigger has been received, the second timing being timing being temporally different from the first timing and being timing indicating the start position of the speech detected; and registering, using an utterance timing registration unit, at least a condition indicating which one of the first timing and the second timing is earlier, wherein the condition is stored in one of the storage and the utterance timing registration unit, and the speaker identification unit identifies the speaker of the speech from the one or more speakers based on the first timing, the second timing, and plural items of registration information registered by the utterance timing registration unit and each indicating a temporal position of the second timing with respect to the first timing.

7. A non-transitory computer-readable recording medium for use in a computer, the recording medium having a computer program recorded thereon for causing the computer to execute the speech input method according to claim 6.

* * * * *